Aug. 13, 1968     L. L. SCHWARZ     3,396,744
SYSTEM FOR ELIMINATION OF CONDENSATION IN FUEL STORAGE TANKS
Filed Dec. 6, 1962     2 Sheets-Sheet 1

INVENTOR.
LEO L. SCHWARZ
BY
ATTORNEY.

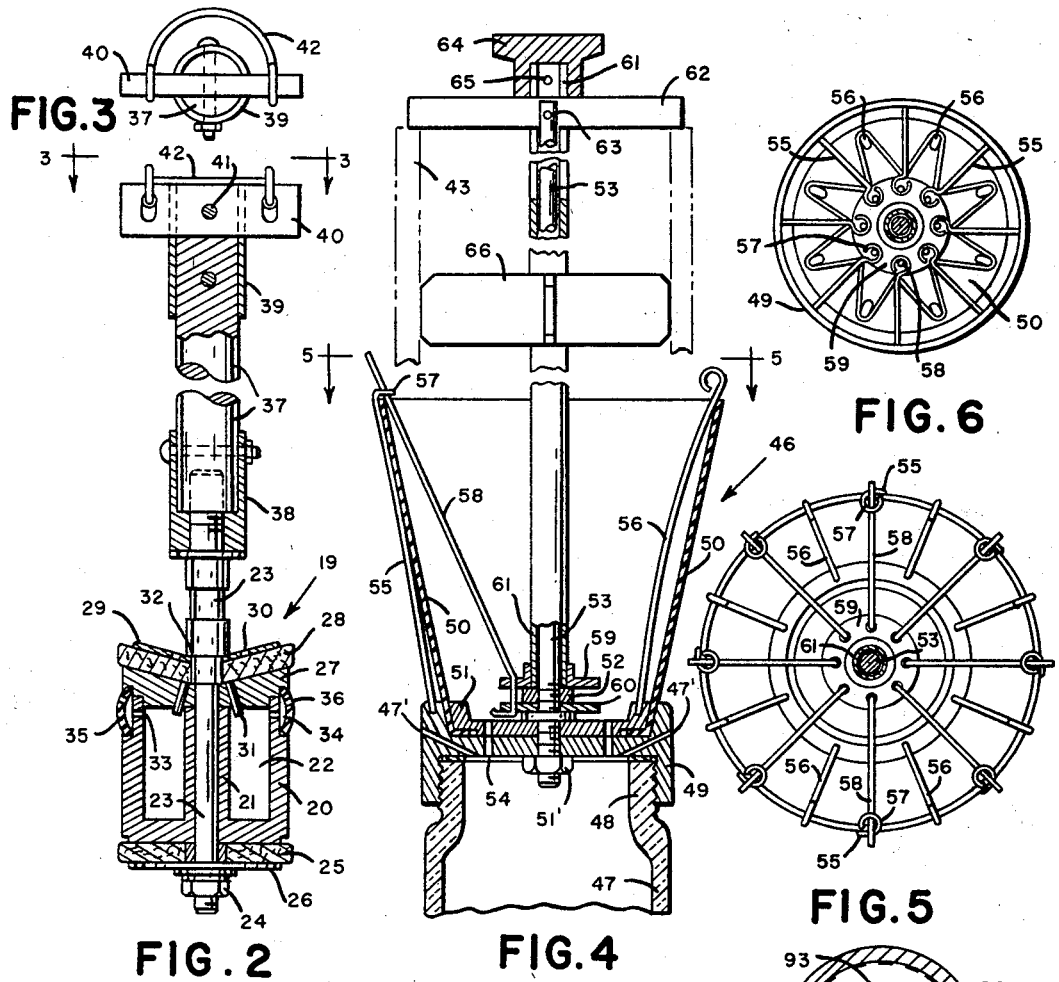

United States Patent Office 3,396,744
Patented Aug. 13, 1968

3,396,744
SYSTEM FOR ELIMINATION OF CONDENSATION IN FUEL STORAGE TANKS
Leo L. Schwarz, Crescent Place, Stepney, Conn.
Filed Dec. 6, 1962, Ser. No. 242,791
16 Claims. (Cl. 137—246.23)

This invention relates to a system and apparatus for preventing the corrosive action of accumulated water within fuel tanks and the like.

It is a well known fact that moisture in the air within a fuel storage tank condenses and accumulates at the bottom of the tank, ultimately rusting through the tank shell and causing the fuel within the tank to leak out. Particularly is this condition prevalent in fuel tanks that are buried in the ground.

The principal object of this invention is to provide a system and apparatus for preventing the destruction of fuel storage tanks by the corrosive action of accumulated condensed moisture therein.

Another object of the invention is to provide an air venting arrangement for fuel storage tanks that will admit only conditioned air thereto when the fuel level within the tank drops during use of the fuel therein.

Still another object of the invention is to provide such a system and apparatus in which the air within the tank is vented to the outside atmosphere during the filling of the tank without permitting the entrance to the tank of unconditioned air.

Still another object of the invention is to provide such a system and apparatus in which the air within the tank, as the fuel therein is consumed, is prevented access to the filling pipe of the tank.

Another object of the invention is to provide such a system and apparatus in which a device is provided which will condense and collect any moist air within the storage tank so as to eliminate any accumulation of water in contact with the metal of the tank.

Still another object of the invention is to provide an automatic vent for a fuel storage tank that will be responsive to very slight pressure variations.

Another object of the invention is to provide such a system and apparatus that includes sensitive check valve means responsive to slight negative pressures.

Fuel storage tanks are usually provided with four openings, one of which is connected to the fuel inlet line; another accommodates the feed and return lines leading to the apparatus to which the fuel of the tank is fed; the third opening accommodates a vent; and the fourth opening is usually capped and not used.

In one aspect of the present invention, the vent may extend into the building containing the apparatus to be supplied with fuel, and may be connected to a sensitive vent valve that has an exhaust line that passes through the wall of the building to the outside atmosphere.

In another aspect of the invention, the sensitive vent valve may be gravity operated to close and may possess the capability of opening under relatively light positive pressure.

In still another aspect of the invention, an air supply line leading from a source of conditioned air may be connected to the vent between the sensitive vent valve and the tank.

In still another aspect of the invention, the air supply line may be provided with an air filter and sensitive check valve means for preventing the venting of tank air into the location of the source of supply air.

In still another aspect of the invention, a removable plug may be inserted within the filler pipe of the tank and be located therein at the connection of the filler pipe to the tank in order to prevent any moisture within the air in the tank from condensing.

In a still further aspect of the invention, a fourth opening in the tank may be connected to an auxiliary pipe similar to the filler pipe which may be open to the interior of the tank but closed at the top thereof so as to encourage the condensation of moisture within the air in the tank.

In still another aspect of the invention, a removable water collecting device may be supported beneath the connection of this auxiliary pipe to the tank for collecting any water that may drain down the sides of the auxiliary pipe.

The above, other objects and novel features of the invention will become apparent from the following specification and accompanying drawings which are merely exemplary.

In the drawings:

FIG. 2 is a sectional elevational view of the plug shown in FIG. 1;

FIG. 3 is a view taken along line 3—3 of FIG. 2;

FIG. 4 is a partial sectional elevational view of the condensation collector shown in FIG. 1;

FIG. 5 is a view taken substantially along line 5—5 of FIG. 4, showing a condensation collecting element in open position;

FIG. 6 is a view of the element of FIG. 5 in closed or collapsed condition;

FIG. 7 is a sectional view of the vent valve shown in FIG. 1;

FIG. 8 is a partial sectional view of one of the check valves shown in FIG. 1; and FIG. 9 is a sectional view taken substantially along line 9—9 of FIG. 8.

Figure 1:
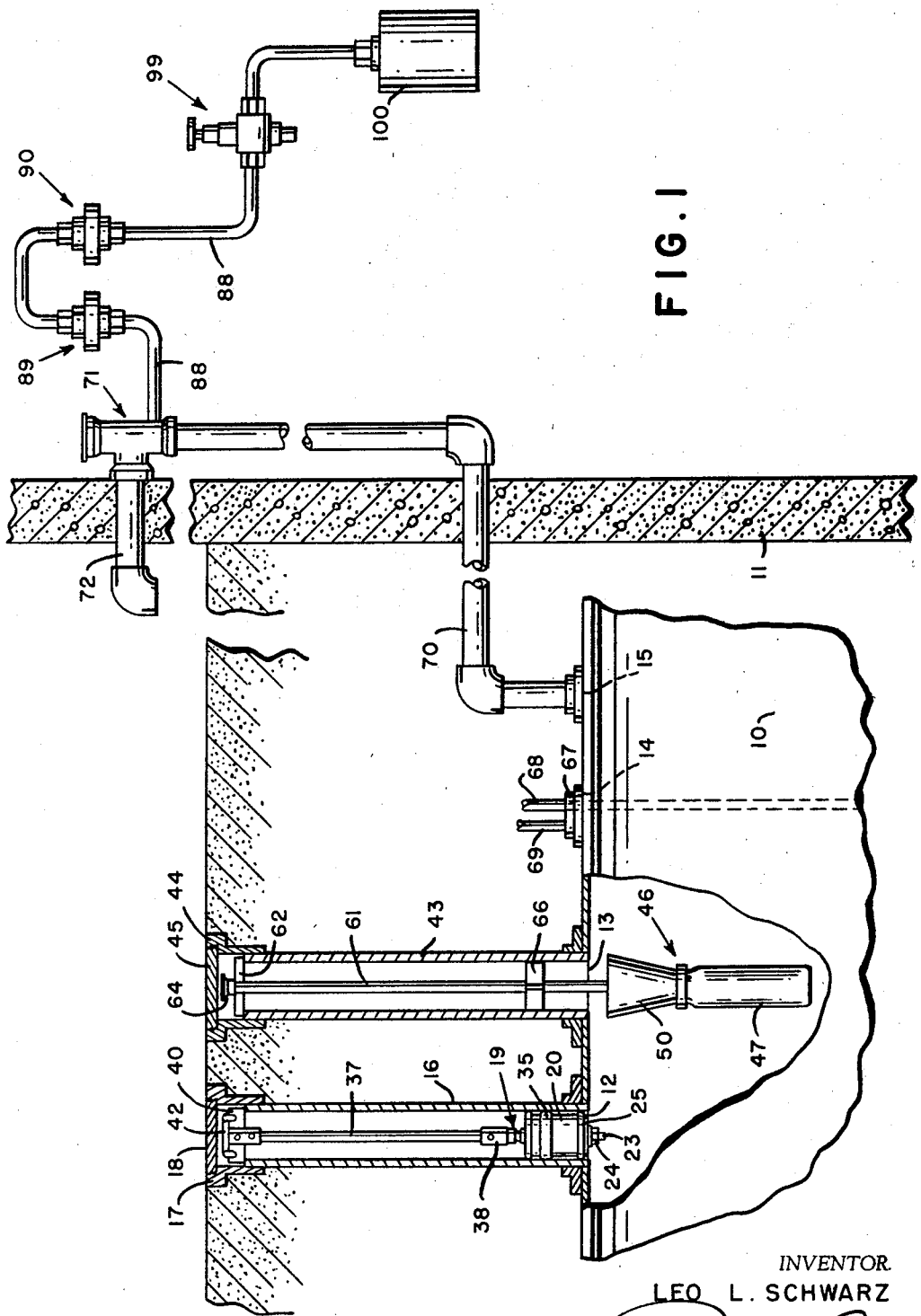
FIG. 1 is a sectional elevational view of a system to which the principles of the invention have been applied.

Referring to the drawings, and particularly to FIG. 1, the principles of the invention are shown as applied to a fuel storage system including a tank 10 which, in the embodiment disclosed, is shown as being buried to a depth of several feet below the ground surface and adjacent to a foundation wall 11 of a building containing apparatus to which the contents of the tank are to be fed. The tank 10, of course, could be located within the foundation 11 as well as on the outside thereof.

The tank 10 is shown has having four flanged openings 12, 13, 14 and 15. The flanged opening 12 is connected to a fill pipe 16 that extends to the surface of the ground where it is provided with a fitting 17 containing a removable cap 18 as is the usual construction. Heretofore, relatively warm, humid air within the tank 10 collected in the fill pipe 16 and when the outside temperature fell during the winter months, the moisture in this humid air condensed on the side walls near the top of the pipe 16. During the winter, this condensation froze in the form of a crust of ice within the pipe 16, building up in the thickness depending upon the amount of humidity in the air within tank 10. During warm weather the following spring, this ice melted and drained into tank 10. Being heavier than the fuel therein, it gravitated to the bottom of the tank, accumulating there in contact with the tank shell, ultimately corroding the metal of the shell and destroying the tank.

In the present invention, this condition has been overcome by providing a removable plug member 19 adapted to seal the opening leading from the tank to the pipe 16. Referring to FIG. 2, the plug member 19 may comprise a hollow cylindrical member 20 having a centrally located hollow boss 21 therein forming an annular collecting chamber 22 for a purpose to be described later. A rod 23 extends longitudinally through the hollow boss 21, and a nut 24 threaded onto its lower end holds a sealing ring 25 to the bottom of member 20 by disc means 26. The seal 25 may be made of felt or other absorbent material, and preferably is saturated with oil to enhance its sealing effect.

The upper end of member 20 is closed by a removable cap member 27, the upper surface of which is funnel-shaped to act as a catch basin as will be explained later. Another felt seal 28 may be attached to the cap 27 and it may follow the contour of the top of member 27, being held in place by a funnel-shaped washer 29 having drain holes 30 therein. Other drain passages 31 may pass through the cap 27 leading to the collecting chamber 22. The member 20 and cap 27 may be held together between a shoulder 32 on rod 23 and the nut 24.

With the plug member 19 within the fill pipe 16, the seal 25 seals off the opening from tank 10 to pipe 16, thereby preventing any air within tank 10 from rising into pipe 16 where the moisture therein would tend to condense and drain into tank 10. Should any water leak into pipe 16 due to a faulty seal between it and cap 18, such water would be collected by the funnel-shaped cap 27, be absorbed by felt seal 28, and when the latter was saturated, would drain through passages 31 into annular chamber 22. In order to exhaust the air from chamber 22, holes 33 may be located through the side wall of member 20 leading to a relieved portion 34 that may be closed by an annular sealing ring 35 of rubber or the like having passages 36 therethrough to exhaust the air from within chamber 22.

The rod 23 may extend upwardly to the top of pipe 16 and is shown as connected to a rod 37 through a connector 38. The upper end of rod 37 may support a tubular element 39 which is slotted to receive a bar 40 that may be held to element 39 by a pin 41. A wire handle 42 may be pivotally attached to bar 40 such that it can lay flush with the top of bar 40. The bar 40 is long enough so that its ends can rest on the top of pipe 16 within flanged fitting 17 and such that when in place supporting plug member 19, the cap 18 can be applied to fitting 17 without interference.

When it is desired to fill tank 10, plug member 19 is removed and its chamber 22 may be emptied prior to replacing the plug after tank 10 is filled with fuel.

Referring again to FIG. 1, in order to further ensure against the formation of water within the tank 10 by the condensing of moisture-laden air therein, a condensation accumulator may be employed. It may be located within a pipe 43 connected to the flange opening 13. It may extend to the surface of the ground and include a fitting 44 receiving a cap 45 therein similar to that for pipe 16. The pipe 43 is purposely left open for the collection of air therein from tank 10 so as to encourage condensation of the moisture in the air on the side wall of pipe 43.

In order to prevent the condensed moisture from draining into tank 10, an accumulator 46 is mounted beneath the opening between tank 10 and pipe 43. Referring to FIGS. 4, 5 and 6, the accumulator may comprise a container 47 which, in the embodiment disclosed, is shown as a bottle having a threaded end 48 that is sealingly threaded into a cap member 49. Cap member 49 may have a flexible skirt 50 attached to it by a disc-like element 51 that is held to cap 49 in a manner to clamp the lower inturned edge of flexible skirt 50 between nuts 51′, 52 threaded onto the lower end of a rod 53. The flexible skirt 50 is generally funnel-shaped in its open extended position, as shown in FIG. 4, wherein the diameter of its upper end is greater than that of the pipe 43 so as to ensure the collection of all drainage from pipe 43. The top of cap 49 and the disc 51 are provided with through passages 54 for the passage of water from the interior of funnel-shaped skirt 50 to the container 47.

The skirt 50 is adapted to be collapsed and opened somewhat like an umbrella so that in its collapsed condition, its outside diameter is less than the inside diameter of pipe 43 to facilitate its removal from, and admission to, tank 10 for the purpose of emptying the collected water therein. Accordingly, flexible wire elements 55 and 56 in alternating relation have their lower ends within recesses arranged in spaced relation about cap member 49 and such that the wire elements 55 are on the exterior of skirt member 50, while elements 56 are on the interior thereof. The upper end of each element 55 is provided with an eye 57 in a plane at right angles to rod 53 for receiving the upper free ends of other flexible wire elements 58. The lower end of each wire element 58 passes through an aperture in a disc 59, thence through an aperture in, and anchored to, a disc 60 that is fixed to rod 53 by the nut 52 that secures the inturned edge of skirt 50. The disc 59 is fixed to the bottom of a tube 61 that telescopes rod 53 and extends upwardly beyond the top of rod 53. The upper end of tube 61 is slotted to receive a bar 62 that is fixed to rod 53 by a pin 63. Above bar 62, tubular element 61 is attached to a knob 64 by a pin 65. A spacing spider 66 may be fixed to tube 61 intermediate its top and bottom for cooperating with the inner surface of the pipe 43 to locate rod 53 and tube 61 centrally thereof.

The length of bar 62 is such as to rest on the top of the pipe 43 within fitting 44 and such that in the position shown in FIG. 4, the cap 45 may be applied to fitting 44 without interference with knob 64. By holding the bar 62 down with one hand, the knob 64 and tube 61 can be moved upwardly, thereby raising disc 59, causing wires 58 to collapse so that the skirt 50 is arranged in a pleated fashion by wires 56, with the outside diameter of the skirt being less than the inside diameter of pipe 43, as shown in FIG. 6.

From the foregoing it is evident that the moisture accumulator can with facility be inserted in and removed from tank 10. Furthermore, it is apparent that when the tank 10 is filled with fuel, container 47 and opened skirt member 50 also fills with oil. However, when the oil level falls in tank 10, oil within the skirt 50 will also fall since it will drain out into tank 10 through ports 47′. This will prevent splashing of the condensed moisture as it melts and drains into skirt 50. Additionally, as the water builds up in container 47, the oil therein is forced out through ports 47′.

Referring again to FIG. 1, the flanged opening 14 is provided with a cap 67 through which supply line 68 and return line 69 extend, which lines lead to the location where the fuel in tank 10 is supplied. The flanged opening 15 is connected to a vent line 70 that is shown as extending through the foundation 11 to the interior of a building containing a furnace or the like to which the fuel from tank 10 is delivered. Vent line 70 is connected to a sensitive valve 71 having an outlet 72 passing through wall 11 leading to the outside and including a downturned elbow and screen so that rain water will not collect in it and to keep out all foreign matter and insects.

Referring to FIG. 7, the valve 71 comprises a T-shaped body 73 having an inlet 74, an outlet 75 and a closure cap 76. Beneath cap 76 a flanged cylindrical member 77 may be mounted. Member 77 may include an annular chamber 78 adapted to hold a quantity of lubricating oil. It may also include an "Oilite" bearing 78′ through which a tubular shaft 79 extends, which latter is adapted to be reciprocated within the bearing 78′. An inverted, dished diaphragm 80 of extremely light weight, preferably made of brass, bronze or stainless steel, is fixed to the bottom of tubular shaft 79 by a nut 81. An annular surface 82 at the peripheral edge of diaphragm 80 is adapted to rest on a seat 83 located within the inlet 74 to the body 73. The oil chamber 78 may include a wick 84 leading to another wick 85, one end of the latter of which contacts the tubular shaft 79. The arrangement is such that the oil feeds by capillary action to the tube 79, thence down its outer peripheral surface along the upper surface of diaphragm 80 and forms an oil seal between the surface 82 and seat 83. The parts including tube 79 and diaphragm 80 are light enough so that the assembly moves upwardly upon slight increase in pressure of the air within tank 10 as it is being filled with fuel. Additionally, these parts are heavy enough to gravitate to closed position upon the cessation of the flow of fuel into tank 10. In order to prevent compression of air within the space in member 77 that receives tubular shaft 79 as the latter rises, holes 86 extend from the interior of tube 79 to the exterior thereof.

The valve body 73 is provided with a port 87 that may be connected to a line 88 (FIG. 1) in which sensitive, reversely arranged check valves 89 and 90 are located. Referring to FIGS. 8 and 9, the valve 89 may comprise a portion 91 having a chamber 92 therein that includes spaced, communicating passages 93 (FIG. 9) that extend from the chamber 92 to another similar chamber 94 within a cap member 95 that is threaded onto the portion 91. A diaphragm 96 may be located between the chambers 92 and 94, and as shown in FIG. 9, it does not cover the communicating passages 93. There are no passages in cap 95 corresponding to the passages 93 in member 91, hence when the diaphragm 96 is in its lower position as shown in FIG. 8, air can pass from the port 97 of cap 95 to the port 98 of member 91. And, when diaphragm 96 is in its upper position, air cannot pass from port 98 to port 97.

Referring again to FIG. 1, wherein valve 89 is in the condition shown in FIG. 8 and valve 90 is reversed relative to valve 89, the slightest negative pressure within line 88 causes valves 89 and 90 to pass air to the tank 10; and the slightest positive pressure in line 88 caused by the filling of tank 10 closes valves 89 and 90 to the passage or air through line 88.

The line 88 may include a fire hazard control valve 99 that will close in response to a predetermined temperature, thus stopping the flow of fuel to the furnace being supplied. The end of line 88 may have an air filter and/or moisture eliminator 100 for conditioning any air that is admitted to tank 10 incident to the consumption of the fuel therein.

Although the various features of the improved system and apparatus for eliminating condensed moisture in a storage tank have been shown and described in detail to fully disclose one embodiment of the invention, it will be evident that changes may be made in such details and certain features may be used without others without departing from the principles of the invention.

What is claimed is:

1. In a system for storing fuel oil that is adapted to be fed to a point of use, comprising in combination, a fuel storage tank; a filling pipe connected to said tank; supply line means leading from said tank to a location of use; a vent pipe connected to said tank; a valve within said vent pipe responsive to slight positive pressure causing it to open and to vent said tank to atmosphere; an air supply line connected to said vent pipe ahead of said valve; check valve means within said air supply line responsive to slight positive pressure to close, and slight negative pressure to open, the entrance to said air supply line being supplied with conditioned air; removable plug means within said filling pipe adapted to block communication between the interior of said tank and said filling pipe at the point at which said filling pipe is connected to said tank; and means forming part of said plug means for collecting any water that leaks into said filling pipe above said plug means.

2. In a system for storing fuel oil that is adapted to be fed to a point of use according to claim 1, wherein said vent pipe valve includes a body having passage means extending therethrough and another passage at an angle to said through passage means; a seat in said through passage means; a removable cap closing one end of said through passage means; means beneath said cap for supporting a sleeve bearing along the axial centerline of said through passage means; a reciprocable rod within said sleeve bearing; and a thin inverted dish-shaped diaphragm connected to said rod and adapted to cooperate with said seat.

3. In a system for storing fuel oil that is adapted to be fed to a point of use according to claim 1, wherein said air supply line includes a body having a bore; first and second counterbores therein, providing a bore leading to a chamber surrounded by a shoulder beneath the top of said body; a cap threaded onto said body portion and including a bore therein; a thin diaphragm means between said body and cap; and port means leading from said first counterbore within said body to the top of said body radially beyond the periphery of said diaphragm means.

4. In a fuel storage tank, a filling pipe having a fitting at its upper end for receiving a removable cap; a plug adapted removably to be inserted within said filling pipe to a point adjacent the connection of said pipe to said tank, said plug comprising a hollow cylindrical body portion having a closed lower end forming a collecting chamber therein; a sealing ring surrounding the lower end of said body portion; a cap portion closing the upper end of said body portion, said cap including a dish-shaped surface for collecting liquid leaking into said filling pipe above said plug; and passage means extending from the exterior of said dish-shaped cap to the interior of said hollow body portion.

5. In a fuel storage tank, a filling pipe having a fitting at its upper end for receiving a removable cap; a plug adapted removably to be inserted within said filling pipe to a point adjacent the connection of said pipe to said tank, said plug comprising a hollow cylindrical body portion having a closed lower end forming a collecting chamber therein; a sealing ring surrounding the lower end of said body portion; a cap portion closing the upper end of said body portion, said cap including a dish-shaped surface for collecting liquid leaking into said filling pipe above said plug; passage means extending from the exterior of said dish-shaped cap to the interior of said hollow body portion; and a rod extending from said plug to the top of said filling pipe and including a handle portion adapted to rest within the fitting on said pipe without interfering with the cap adapted to be received by said fitting.

6. In a fuel storage tank, a filling pipe having a fitting at its upper end for receiving a removable cap; a plug adapted removably to be inserted within said filling pipe to a point adjacent the connection of said pipe to said tank, said plug comprising a hollow cylindrical body portion having a closed lower end forming a collecting chamber therein; a sealing ring surrounding the lower end of said body portion; a cap portion closing the upper end of said body portion, said cap including a dish-shaped surface for collecting liquid leaking into said filling pipe above said plug; an absorbent disk mounted within said dish-shaped cap; and passage means extending from the exterior of said dish-shaped cap to the interior of said hollow body portion.

7. In a system for storing fuel oil that is adapted to be fed to a point of use, comprising in combination, a fuel storage tank; an auxiliary pipe connected to said tank including a fitting adapted to receive a removable cap; supply line means leading from said tank to a location of use; a vent pipe connected to said tank; and means connected to said auxiliary pipe beneath the connection of said auxiliary pipe to said tank for collecting moisture that condenses in said auxiliary pipe.

8. In a system for storing fuel oil that is adapted to be fed to a point of use, comprising in combination, a fuel storage tank; an auxiliary pipe connected to said tank including a fitting adapted to receive a removable cap; supply line means leading from said tank to a location of use; a vent pipe connected to said tank; and means connected to said auxiliary pipe beneath the connection of said auxiliary pipe to said tank for collecting moisture that condenses in said auxiliary pipe, said collecting means comprising an expansible and collapsible flexible member adapted in its collapsed condition to pass through said auxiliary pipe and in its expanded condition to extend beyond the inside diameter of said auxiliary pipe.

9. In a system for storing fuel oil that is adapted to be fed to a point of use, comprising in combination, a fuel storage tank; an auxiliary pipe connected to said tank including a fitting adapted to receive a removable cap; supply line means leading from said tank to a location of use; a vent pipe connected to said tank; removable means within said auxiliary pipe beneath the connection of said auxiliary pipe to said tank for collecting moisture that condenses in said auxiliary pipe, said collecting means comprising an expansible and collapsible flexible member adapted in its collapsed condition to pass said auxiliary pipe and in its expanded condition to extend beyond the inside diameter of said auxiliary pipe; and a rod extending from said collecting means to the top of said auxiliary pipe, said rod including supporting means adapted to rest on the top of said auxiliary pipe within said fitting without interfering with the cap adapted to be received by said fitting.

10. In a system for storing fuel oil that is adapted to be fed to a point of use, comprising in combination, a fuel storage tank; an auxiliary pipe connected to said tank including a fitting adapted to receive a removable cap; supply line means leading from said tank to a location of use; a vent pipe connected to said tank; removable means within said auxiliary pipe beneath the connection of said auxiliary pipe to said tank for collecting moisture that condenses in said auxiliary pipe, said collecting means comprising an expansible and collapsible flexible member adapted in its collapsed condition to pass through said auxiliary pipe and in its expanded condition to extend beyond the inside diameter of said auxiliary pipe; and telescoping rod means extending from said collecting means to the top of said auxiliary pipe for collapsing and expanding said collecting means.

11. A condensation collector for fuel storage tanks comprising a container; a cap threaded onto said container and including passage means leading through said cap to the interior of said container; a funnel-shaped flexible skirt member secured to said cap member; telescoping rod means connected to said cap member; and flexible wire means connected to said skirt member and said telescoping rod means adapted to expand and collapse said skirt member upon telescoping movement of said rod means.

12. In a system for storing fuel oil that is adapted to be fed to a point of use, comprising in combination, a fuel storage tank; a filling pipe connected to said tank; supply line means leading from said tank to a location of use; a vent pipe connected to said tank; a valve within said vent pipe responsive to slight positive pressure causing it to open and to vent said tank to atmosphere; an air supply line connected to said vent pipe ahead of said valve; check valve means within said air supply line responsive to slight positive pressure to close, and slight negative pressure to open, the entrance to said air supply line being supplied with conditioned air; removable plug means within said filling pipe adapted to block communication between the interior of said tank and said filling pipe at the point at which said filling pipe is connected to said tank; another pipe connected to said tank and extending to the elevation of said filling pipe and including a fitting adapted to receive a removable cap; and means connected to said other pipe beneath the connection of said other pipe to said tank for collecting moisture that condenses in said other pipe.

13. In a system for storing fuel oil that is adapted to be fed to a point of use, comprising in combination, a fuel storage tank; a filling pipe connected to said tank; supply line means leading from said tank to a location of use; a vent pipe connected to said tank; a valve within said vent pipe responsive to slight positive pressure causing it to open and to vent said tank to atmosphere; an air supply line connected to said vent pipe ahead of said valve; check valve means within said air supply line responsive to slight positive pressure to close, and slight negative pressure to open, the entrance to said air supply line being supplied with conditioned air; removable plug means within said filling pipe adapted to block communication between the interior of said tank and said filling pipe at the point at which said filling pipe is connected to said tank; another pipe connected to said tank and extending to the elevation of said filling pipe and including a fitting adapted to receive a removable cap; and means connected to said other pipe beneath the connection of said other pipe to said tank for collecting moisture that condenses in said other pipe, said collecting means comprising an expansible and collapsible flexible member adapted in its collapsed condition to pass through said other pipe and in its expanded condition to extend beyond the inside diameter of said other pipe.

14. In a system for storing fuel oil that is adapted to be fed to a point of use, comprising in combination, a fuel storage tank; a filling pipe connected to said tank; supply line means leading from said tank to a location of use; a vent pipe connected to said tank; a valve within said vent pipe responsive to slight positive pressure causing it to open and to vent said tank to atmosphere; an air supply line connected to said vent pipe ahead of said valve; check valve means within said air supply line responsive to slight positive pressure to close, and slight negative pressure to open, the entrance to said air supply line being supplied with conditioned air; removable plug means within said filling pipe adapted to block communication between the interior of said tank and said filling pipe at the point at which said filling pipe is connected to said tank; means forming part of said plug means for collecting any water that leaks into said filling pipe above said plug means; another pipe connected to said tank and extending to the elevation of said filling pipe and including a fitting adapted to receive a removable cap; and means connected to said other pipe beneath the connection of said other pipe to said tank for collecting moisture that condenses in said other pipe.

15. In a system for storing fuel oil that is adapted to be fed to a point of use, comprising in combination, a fuel storage tank; a filling pipe connected to said tank; supply line means leading from said tank to a location of use; a vent pipe connected to said tank; a valve within said vent pipe responsive to slight positive pressure causing it to open and to vent said tank to atmosphere; an air supply line connected to said vent pipe ahead of said valve; check valve means within said air supply line responsive to slight positive pressure to close, and slight negative pressure to open, the entrance to said air supply line being supplied with conditioned air; removable plug means within said filling pipe adapted to block communication between the interior of said tank and said filling pipe at the point at which said filling pipe is connected to said tank; another pipe connected to said tank and extending to the elevation of said filling pipe and including a fitting adapted to receive a removable cap; removable means within said other pipe beneath the connection of said other pipe to said tank for collecting moisture that condenses in said other pipe, said collecting means comprising an expansible and collapsible flexible member adapted in its collapsed condition to pass through said other pipe and in its expanded condition to extend beyond the inside diameter of said other pipe; and telescoping rod means extending from said collecting means to the top of said other pipe for collapsing and expanding said collecting means.

16. A vent valve for a fuel storage tank comprising a body having passage means extending therethrough and another passage at an angle to said through passage means; a seat in said through passage means; a removable cap closing one end of said through passage means; means beneath said cap for supporting a sleeve bearing along the axial centerline of said through passage means; a reciprocable rod within said sleeve bearing; a thin inverted dish-shaped diaphragm connected to said rod and adapted to cooperate with said seat; a chamber within said sleeve bearing supporting means for holding a supply of oil; and wick means leading from said chamber to said rod, whereby a constant supply of oil is fed to said rod which gravitates to the periphery of said diaphragm forming a seal between said diaphragm and seat.

References Cited

UNITED STATES PATENTS

| | | | |
|---|---|---|---|
| 2,264,760 | 12/1941 | Kling | 220—86 |
| 3,008,603 | 11/1961 | Scully | 220—86 |
| 1,631,438 | 6/1927 | Sullivan | 137—314 |
| 2,316,406 | 4/1943 | Cornelius | 137—314 |
| 637,037 | 11/1899 | Scott | 137—533.21 |
| 968,559 | 8/1910 | Heilig | 137—533.21 |
| 1,423,323 | 7/1922 | Hazard | 137—533.17 |
| 1,483,436 | 2/1924 | Hazard | 137—533.17 |
| 249,918 | 11/1881 | Forster | 220—85 |
| 2,092,925 | 9/1937 | Lithgow | 220—85 |
| 2,342,723 | 2/1944 | Buttner | 220—85 X |
| 2,457,763 | 12/1948 | Wiggins | 137—314 X |
| 293,460 | 2/1884 | Heinig et al. | 137—533 X |
| 1,018,193 | 2/1912 | Hinkle | 222—108 |
| 2,320,913 | 6/1943 | Crowell | 137—533.17 X |

WILLIAM F. O'DEA, *Primary Examiner.*

R. GERARD, *Assistant Examiner.*

UNITED STATES PATENT OFFICE
CERTIFICATE OF CORRECTION

Patent No. 3,396,744                              August 13, 1968

Leo L. Schwarz

It is certified that error appears in the above identified patent and that said Letters Patent are hereby corrected as shown below:

Column 2, lines 54 and 55, "in the thickness" should read -- in thickness --. Column 7, line 17, "pass said" should read -- pass through said --.

Signed and sealed this 20th day of January 1970.

(SEAL)
Attest:

Edward M. Fletcher, Jr.                     WILLIAM E. SCHUYLER, JR.
Attesting Officer                                 Commissioner of Patents